(12) United States Patent
Anderson et al.

(10) Patent No.: US 11,823,298 B2
(45) Date of Patent: *Nov. 21, 2023

(54) METHODS AND SYSTEMS FOR IMPRESSION INVENTORY TRADING

(71) Applicant: Microsoft Technology Licensing, LLC, Redmond, WA (US)

(72) Inventors: Eric Anderson, Eugene, OR (US); Catherine S. O'Kelley, New York, NY (US); Wendy W. Johansson, San Francisco, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,144

(22) Filed: Feb. 6, 2023

(65) Prior Publication Data

US 2023/0177630 A1 Jun. 8, 2023

Related U.S. Application Data

(63) Continuation of application No. 16/392,724, filed on Apr. 24, 2019, now Pat. No. 11,574,374, which is a
(Continued)

(51) Int. Cl.
*G06Q 50/18* (2012.01)
*G06Q 30/0273* (2023.01)

(52) U.S. Cl.
CPC ....... *G06Q 50/188* (2013.01); *G06Q 30/0273* (2013.01)

(58) Field of Classification Search
None
See application file for complete search history.

(56) References Cited

U.S. PATENT DOCUMENTS

| 5,918,014 A | 6/1999 | Robinson |
| 6,131,087 A | 10/2000 | Luke et al. |

(Continued)

OTHER PUBLICATIONS

Ebbert, John, "Define It—What is Real Time Bidding?" [online] adexchanger.com, available at: < https://www.adexchanger.com/online-advertising/real-time-bidding/ >, published on Nov. 27, 2012. (Year: 2012).*

(Continued)

*Primary Examiner* — Richard W. Crandall
(74) *Attorney, Agent, or Firm* — CALFEE, HALTER & GRISWOLD, LLP

(57) ABSTRACT

Systems and methods for providing an impression inventory trading platform are described. A specification of impression inventory for sale is received from a seller, the impression inventory having associated therewith a plurality of attributes. Each attribute is specified as either visible or hidden to a potential impression inventory buyer. The impression inventory specification and visible attributes associated therewith are provided to one or more potential impression inventory buyers via a user interface, and negotiation for purchase of the impression inventory is facilitated between the seller and one or more of the potential impression inventory buyers via the user interface.

20 Claims, 14 Drawing Sheets

Related U.S. Application Data continuation of application No. 14/295,652, filed on Jun. 4, 2014, now Pat. No. 10,319,055.

(60) Provisional application No. 61/929,912, filed on Jan. 21, 2014, provisional application No. 61/831,106, filed on Jun. 4, 2013.

(56) References Cited

U.S. PATENT DOCUMENTS

| | | | |
|---|---|---|---|
| 6,601,043 | B1 | 7/2003 | Purcell |
| 6,681,156 | B1 | 1/2004 | Weiss |
| 10,319,055 | B2 | 6/2019 | Anderson et al. |
| 2002/0069156 | A1 | 6/2002 | Adam et al. |
| 2002/0099639 | A1 | 7/2002 | Caughey et al. |
| 2002/0178021 | A1 | 11/2002 | Melchoir et al. |
| 2003/0074252 | A1 | 4/2003 | Chandler-Pepelnjak et al. |
| 2004/0103024 | A1 | 5/2004 | Patel et al. |
| 2005/0187818 | A1 | 8/2005 | Zito et al. |
| 2005/0240531 | A1 | 10/2005 | Wolff |
| 2006/0085276 | A1 | 4/2006 | Hoech et al. |
| 2006/0122907 | A1 | 6/2006 | Gould |
| 2006/0190385 | A1* | 8/2006 | Dresden ............... G06Q 30/02 705/37 |
| 2006/0212350 | A1 | 9/2006 | Ellis et al. |
| 2006/0242017 | A1 | 10/2006 | Libes et al. |
| 2006/0271429 | A1 | 11/2006 | Borgs et al. |
| 2007/0083885 | A1 | 4/2007 | Harding |
| 2008/0033808 | A1 | 2/2008 | Black et al. |
| 2008/0103903 | A1 | 5/2008 | Flake et al. |
| 2008/0154784 | A1 | 6/2008 | Veeraraghavan |
| 2008/0167943 | A1 | 7/2008 | O'Neil et al. |
| 2008/0195475 | A1 | 8/2008 | Lambert et al. |
| 2008/0275753 | A1 | 11/2008 | Protheroe et al. |
| 2008/0275777 | A1 | 11/2008 | Protheroe et al. |
| 2008/0313092 | A1 | 12/2008 | Lanham et al. |
| 2009/0012874 | A1 | 1/2009 | Case |
| 2009/0012903 | A1 | 1/2009 | Subramanian et al. |
| 2009/0055272 | A1 | 2/2009 | Numaoka et al. |
| 2009/0287596 | A1 | 11/2009 | Torrenegra |
| 2009/0287610 | A1 | 11/2009 | Bradshaw et al. |
| 2009/0288012 | A1 | 11/2009 | Hertel et al. |
| 2009/0299799 | A1 | 12/2009 | Racho et al. |
| 2010/0100414 | A1 | 4/2010 | Lin et al. |
| 2010/0113072 | A1 | 5/2010 | Gibson et al. |
| 2010/0185516 | A1 | 7/2010 | Swanson et al. |
| 2010/0262498 | A1* | 10/2010 | Nolet ............... G06Q 30/0251 705/14.71 |
| 2010/0268603 | A1 | 10/2010 | Nolet et al. |
| 2011/0040636 | A1 | 2/2011 | Catanzaro et al. |
| 2011/0106622 | A1 | 5/2011 | Kuhlman et al. |
| 2011/0119128 | A1 | 5/2011 | Fang et al. |
| 2011/0119129 | A1 | 5/2011 | Pradeep et al. |
| 2011/0131099 | A1 | 6/2011 | Shields et al. |
| 2011/0173126 | A1 | 7/2011 | Knapp et al. |
| 2011/0213679 | A1 | 9/2011 | Petkov et al. |
| 2011/0231264 | A1 | 9/2011 | Dilling et al. |
| 2011/0246267 | A1 | 10/2011 | Williams et al. |
| 2011/0246289 | A1 | 10/2011 | Bowman et al. |
| 2011/0251875 | A1 | 10/2011 | Cosman |
| 2011/0251889 | A1 | 10/2011 | Simard et al. |
| 2011/0258049 | A1 | 10/2011 | Ramer et al. |
| 2011/0295680 | A1 | 12/2011 | Shaw |
| 2012/0036034 | A1 | 2/2012 | Golden et al. |
| 2012/0041816 | A1 | 2/2012 | Buchalter |
| 2012/0150656 | A1 | 6/2012 | Karidi et al. |
| 2012/0246055 | A1 | 9/2012 | Schlifstein et al. |
| 2012/0323674 | A1 | 12/2012 | Simmons et al. |
| 2013/0066725 | A1 | 3/2013 | Umeda |
| 2013/0173400 | A1 | 7/2013 | Koomneef et al. |
| 2014/0006170 | A1 | 1/2014 | Collette et al. |
| 2014/0058849 | A1 | 2/2014 | Saifee et al. |
| 2014/0129351 | A1 | 5/2014 | Ringdahl |
| 2014/0136336 | A1 | 5/2014 | Mak et al. |
| 2014/0149230 | A1 | 5/2014 | Shepard et al. |
| 2014/0180829 | A1 | 6/2014 | Umeda |
| 2014/0188630 | A1 | 7/2014 | Balazs et al. |
| 2014/0244404 | A1 | 8/2014 | Manson et al. |
| 2014/0258000 | A1 | 9/2014 | Connolly et al. |
| 2014/0278981 | A1 | 9/2014 | Mersov et al. |
| 2014/0279056 | A1 | 9/2014 | Sullivan et al. |
| 2014/0358798 | A1 | 12/2014 | Anderson et al. |
| 2019/0251650 | A1 | 8/2019 | Anderson et al. |

OTHER PUBLICATIONS

"ADRevolution(sm) launches solution to transform digital media", Business Wire Retrieved from https://dialog.proquest.com/professional/preofessiona/docview/674634164?accountid=142257, Nov. 4, 2007, 1.

"Glam media launches private marketplace powered by rubicon project", Business Wire Retrieved from https://dialog.proquest.com/professional/professional/docview/1178684605?accountid=142257, Nov. 20, 2012, 1.

"Market Segmentation", https://en.wikipedia.org/wiki/Market_segmentation, Feb. 25, 2017, 1.

"Traffiq launches online advertising exchange.", Business Wire Retrieved from https://dialog.proquest.com/professional/professional/docview/673941629?accountid=142257, Feb. 25, 2017, 1.

"Office Action for U.S. Appl. No. 16/392,724", dated Apr. 22, 2022, 23 pages.

"Adbot Introduces Rotating Banner Click-Throughs," Business Wire, Published Oct. 3, 1997. (Year: 1997).

"Response to the Office Action for U.S. Appl. No. 16/392,724", Filed Date: Jul. 20, 2022, 16 pages.

"Notice of Allowance and Fees Due for U.S. Appl. No. 16/392,724", dated Oct. 3, 2022, 8 pages.

"Office Action for U.S. Appl. No. 14/295,652", dated Mar. 8, 2017, 44 pages.

"Response to the Office Action for U.S. Appl. No. 14/295,652", Filed Date: Jul. 10, 2017, 12 pages.

"Final Office Action for U.S. Appl. No. 14/295,652", dated Nov. 13, 2017, 24 pages.

"Response to the Final Office Action for U.S. Appl. No. 14/295,552", Filed Date: May 11, 2018, 12 pages.

"Office Action for U.S. Appl. No. 14/295,652", dated May 25, 2018, 32 pages.

"Response to the Office Action for U.S. Appl. No. 14/295,652", Filed Date: Nov. 20, 2018, 10 pages.

"Notice of Allowance and Fees Due for U.S. Appl. No. 14/295,652", dated Jan. 24, 2019, 10 pages.

"Response to Reasons for Allowance for U.S. Appl. No. 14/295,652", Filed Date: Apr. 23, 2019: 2 pages.

* cited by examiner

| appnexus | NETWORK | PARTNERSHIPS | ADVERTISERS | PUBLISHERS | APPS | | Search all objects... |

Partnerships > Jette

JETTE — Block Jette
Contact: Fred Opperman
Phone: (212) 456-8761
Email: fopperman@jette.com
Website: http://www.jette.com
Media kit: download
Partner Type: Platform Seller Analytics | Custom Terms

ⓘ You have accepted Microsoft's proposal and these are now your terms.

Goal ⓘ  Goal: €500,00 spend from April 1, 2013 to June 30, 2013

€23 Spend
/ €500,000 Spend

Targeting Access ⓘ

| | |
|---|---|
| URLs | Full |
| Categories | *Universal: Autos & Entertainment, Fashion & Beauty*<br>*Custom: Pets & Animals.* |
| Gender | No |
| Age | No |
| Publisher | No |
| Placements | No |

Rates

| Inventory | Geo | Age & Gender | Fold Pos | Size | Brand | Value |
|---|---|---|---|---|---|---|
| Run of seller | All | All | All | All | All | €1.20 hard floor |
| INCLUDE jettedai..., (+3 more) | EXCLUDE Germany | All | All | All | All | €0.90 hard floor |
| EXCLUDE jettesp..., (+1 more) | EXCLUDE Germany | M/F, 18-35 | All | All | All | €0.90 soft floor |
| INCLUDE Arts &..., (+4 more) | All | All | All | 500x600 | All | €0.80 hard floor |
| INCLUDE Fashio..., (+1 more) | All | All | All | All | Audi, BMW | -10% Bias |
| INCLUDE Food &..., (+2 more) | All | All | Above the fold | All | All | €1.00 hard floor |

METHODS AND SYSTEMS FOR IMPRESSION INVENTORY TRADING

CROSS-REFERENCE TO RELATED APPLICATIONS

This application is a continuation of U.S. patent application Ser. No. 16/392,724, filed Apr. 24, 2019, which is a continuation of U.S. patent application Ser. No. 14/295,652, filed Jun. 4, 2014, which claims benefit to U.S. Provisional Patent Application No. 61/831,106, filed on Jun. 4, 2013, and U.S. Provisional Patent Application No. 61/929,912, filed on Jan. 21, 2014. All sections of the aforementioned applications are incorporated herein by reference in their entirety.

BACKGROUND

The present disclosure relates generally to impression inventory sales and, more particularly, to systems and methods for providing a negotiation platform for the purchase and sale of online advertising impressions.

Real-time bidding (RTB) has made it easy for buyers to purchase impressions at scale across a large number of publishers, who benefit from monetizing unsold advertising inventory across a large number of buyers. Buyers have leveraged RTB to buy advertising inventory based on user data instead of context, enabling them to get the most out of their budgets by focusing on users that are in target. This, combined with the reduction in face-to-face sales activity, has negatively impacted some large publishers and large strategic sellers by reducing the perceived value of contextual and "premium" inventory. Impression inventory buyers and sellers are currently unable to easily connect and engage in direct inventory trading.

BRIEF SUMMARY

The present disclosure describes various implementations of an impression inventory trading system and accompanying methods that enable advertising impression inventory buyers and sellers to locate each other, discuss potential business relationships, and propose and accept impression inventory sales. The trading platform facilitates a negotiation phase between a buyer and a seller where terms are transparent to both sides of the deal. Ultimately, the disclosed systems and methods provide an increased level of visibility for users of the platform into their access and eligibility to buy or sell with a potential partner.

In one aspect, a computer-implemented method includes the steps of: receiving, from a seller, a specification of impression inventory for sale, the impression inventory having associated therewith a plurality of attributes; specifying, for each of the attributes, whether the respective attribute is visible to a potential impression inventory buyer; providing the impression inventory specification and visible attributes associated therewith to one or more potential impression inventory buyers via a user interface; and facilitating negotiation, via the user interface, between the seller and one or more of the potential impression inventory buyers for purchase of the impression inventory.

In one implementation, the facilitating negotiation comprises: receiving a proposal from a first one of the potential impression inventory buyers for the seller to expose one or more hidden attributes associated with the impression inventory to the first potential impression inventory buyer; and providing the proposal to the seller. The proposal can include an offer to provide a benefit to the seller in exchange for the seller exposing the one or more hidden attributes. A particular benefit to the seller can include a price floor for certain impression inventory or a minimum spend commitment.

In another implementation, a particular attribute includes a full uniform resource locator, a partial uniform resource locator, a domain, an age, a gender, a content category, an auction price floor, a geography, a tag, a publisher, or a fold position.

In a further implementation, the facilitating negotiation includes: receiving from the seller proposed terms for the sale of the impression inventory; providing, via the user interface, the proposed terms to a first one of the potential impression inventory buyers; receiving from the first potential impression inventory buyer an acceptance or rejection of the proposed terms; and providing, via the user interface, the acceptance or rejection to the seller. The proposed terms can include a proposed rate for a sale of at least a subset of the impression inventory. The proposed terms can include proposed targeting access to the impression inventory for the first potential impression inventory buyer.

In yet another implementation, the facilitating negotiation includes: receiving from a first one of the potential impression inventory buyers proposed terms for the purchase of the impression inventory; providing, via the user interface, the proposed terms to the seller; receiving from the seller an acceptance or rejection of the proposed terms; and providing, via the user interface, the acceptance or rejection to the first potential impression inventory buyer. The facilitating negotiation can further include: receiving modifications to the proposed terms from the seller; and providing, via the user interface, the modifications to the first potential impression inventory buyer.

In another aspect, a system includes one or more computers programmed to perform operations including: receiving, from a seller, a specification of impression inventory for sale, the impression inventory having associated therewith a plurality of attributes; specifying, for each of the attributes, whether the respective attribute is visible to a potential impression inventory buyer; providing the impression inventory specification and visible attributes associated therewith to one or more potential impression inventory buyers via a user interface; and facilitating negotiation, via the user interface, between the seller and one or more of the potential impression inventory buyers for purchase of the impression inventory.

In one implementation, the facilitating negotiation comprises: receiving a proposal from a first one of the potential impression inventory buyers for the seller to expose one or more hidden attributes associated with the impression inventory to the first potential impression inventory buyer; and providing the proposal to the seller. The proposal can include an offer to provide a benefit to the seller in exchange for the seller exposing the one or more hidden attributes. A particular benefit to the seller can include a price floor for certain impression inventory or a minimum spend commitment.

In another implementation, a particular attribute includes a full uniform resource locator, a partial uniform resource locator, a domain, an age, a gender, a content category, an auction price floor, a geography, a tag, a publisher, or a fold position.

In a further implementation, the facilitating negotiation includes: receiving from the seller proposed terms for the sale of the impression inventory; providing, via the user interface, the proposed terms to a first one of the potential impression inventory buyers; receiving from the first potential impression inventory buyer an acceptance or rejection of the proposed terms; and providing, via the user interface, the acceptance or rejection to the seller. The proposed terms can include a proposed rate for a sale of at least a subset of the impression inventory. The proposed terms can include proposed targeting access to the impression inventory for the first potential impression inventory buyer.

In yet another implementation, the facilitating negotiation includes: receiving from a first one of the potential impression inventory buyers proposed terms for the purchase of the impression inventory; providing, via the user interface, the proposed terms to the seller; receiving from the seller an acceptance or rejection of the proposed terms; and providing, via the user interface, the acceptance or rejection to the first potential impression inventory buyer. The facilitating negotiation can further include: receiving modifications to the proposed terms from the seller; and providing, via the user interface, the modifications to the first potential impression inventory buyer.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which:

FIG. 4 is an example user interface screen for an impression inventory seller to view and interact with custom transaction terms.

FIG. 5 is an example user interface screen for an impression inventory seller to edit deal terms.

FIG. 6 is an example user interface screen for an impression inventory buyer to edit deal terms.

FIG. 7 is an example user interface screen for viewing analytics.

FIG. 8 is an example user interface screen for an impression inventory buyer to view pending deal terms.

FIG. 9 is an example user interface screen for an impression inventory seller to view pending deal terms.

FIG. 10 is an example user interface screen for viewing and editing partner information.

DETAILED DESCRIPTION

Figure 1:
FIG. 1 is an example user interface screen displaying partner information for an impression inventory seller.

Described herein in various implementations are systems and methods for extending an online advertising platform to enable impression inventory sellers and potential impression inventory buyers and to locate and become acquainted with one another as well as execute trades for impression inventory through a user interface (e.g., a web-based interface). The trades can impact existing advertising campaigns and do not require buyers to target a new object in order to receive a benefit. Further, trades can impact existing campaigns by exposing domains and categories, arbitrating auction mechanics, and determining rate cards. Sellers can grant trusted buyers privileged access to their inventory while maintaining full control over visibility and pricing, and buyers can engage in direct deals with impression inventory sellers, trading price for desired visibility or privileges.

As used herein, "impression inventory" refers to advertisement serving opportunities, such as ad space on one or more websites. Impression inventory can have associated with it various attributes that can be used by impression buyers to target advertisements and/or evaluate the value of the inventory. Attributes can include, but are not limited to, a full uniform resource locator, a partial uniform resource locator, a domain, an age, a gender, a content category, an auction price floor, a geography, a tag, a publisher, a fold position, and/or other demographic information. For example, an impression inventory seller can indicate that certain impression inventory for sale is associated with webpages on the domain ebay.com and impression consumers in the U.S. A potential impression inventory buyer can use this information to determine what it is willing to pay for the inventory, as well as ultimately target advertisements to this particular group.

In one implementation, the present impression inventory trading system includes integration into one or more social networks. For example, the system can integrate with Linkedin® or Facebook® to retrieve additional information about people who use the trading system and show their pictures and roles when they post messages. In another example, the system allows participants to tweet or post a message to other social networks when they get a deal done; e.g., "I just negotiated a media partnership with XYZ Co. via The Impression Inventory Trading Platform!" The system can further include information about companies that can be used for media kits and more sophisticated profiles.

In some implementations, the trading system provides buyers and/or sellers with a user interface (UI) through which the buyers/sellers perform functions associated with the system and receive information related to other buyers/seller and trading transactions. The UI can provide information associated with buyers and sellers, such as an indication of whether a buyer or seller is a member of the online advertising platform, contact information, a company logo/slogan, whether a buyer/seller is eligible to transact with, inventory listing, and the like.

The UI can also provide relationship information between parties, such as an amount of funds exchanged, what items a seller has permitted a buyer to see (e.g., full or partial URLs, age/gender, all/selected content categories, tags, pubs, floor pricing, etc.), and so on. Further, the UI can provide rate card information, such as how much certain inventory will cost a buyer.

The trading system can create an endowment effect by providing the ability to link with other users and track these relationships. For example, the UI can include a "My Associates" screen and a "Find Associates" screen to facilitate interactions among users. In another implementation, the UI provides a way for buyers and sellers that do not have a direct member to invite a partner using an "Invite Partner" button that sends a note inviting the partner onto the trading platform.

With existing techniques, RTB impression inventory sellers are unable to create value by differentiating their media products from run-of-exchange supply. There is value to sellers in directing buyers toward paying higher prices for must-buy inventory. To accomplish this, sellers must create either real (first-party audience) or artificial (withholding transparency) differentiation from the run-of-exchange buying that trading desks lean toward. Currently, sellers cannot easily merchandise or charge differently for specialized media products (defined bundles of inventory) like property, channel, homepage, takeover, or rich media tags. Sellers want to expose their products to specific buyers on and off the advertising platform. The sellers may desire to price discriminate based on the buyer's targeting; e.g., if a buyer has visibility into the seller's "Autos" channel but bids on an impression via a run-of-network (RON) campaign, the buyer should pay the RON price rather than the "Autos" price. Likewise, impression inventory buyers want to know how much they need to pay in order to win "Autos" impressions, and they need to see performance and delivery for the purchase.

For example, assume that Company A has deals set up to buy Publisher X inventory via deal identifier (Deal ID). There are different Deal IDs per brand, per demand-side platform, for each of the different sections of the site: RON, Homepage, and so on. Company A benefits from two things: first, the deal gives Company A the ability to target and report on specific placements, categories, etc. from the publisher. Second, Company A has pre-negotiated the "price" floor with Publisher X. Company A knows it must bid at least $10 to win the impression, and so it ends up bidding in the range of $15-$20.

Accordingly, impression inventory buyers would benefit from elaborate seller relationships for sales pitches or more impressions on high-performance inventory, whereas the seller would benefit from price differentiation. Through the present system, a buyer is able to buy on various impression inventory attributes, such as specified categories, domains, geographies, fold position, and demographic data. In exchange, a seller can be provided with a benefit such as a given floor price for specified products or a spend commitment by the buyer.

In one implementation, the basic unit of a trade is the rate card, by which a buyer and seller agree on a set of prices at which to do business. The rate card can include "market price" for run-of-network audience or performance buying, potentially with a discount factor. Each business relationship can use a single rate card or multiple rate cards. Impression inventory trades can be configured at the buying member level or at the buyer-brand level. Trades can be created by partners of the advertising platform or by the agency clients of the partners. Trades can be executed through bidders external or internal to the advertising platform. Trades can allow the trading parties to negotiate access to impression inventory targeting attributes such as categories, domains, geographies, fold positions, and demographics. One example of a rate card for an inventory trade is shown in Table 1, below, in which a price (e.g., fixed price, auction price, or auction discount) is set for impression inventory associated with a specific row of targeting attributes.

TABLE 1

| Domain | Geo | Category | Fold Position | Demographic | Price |
|---|---|---|---|---|---|
| — | us | Travel | — | | $1.00 |
| — | UK | Auto | — | | $2.50 |
| msn.com | us | — | Above the fold | Women, 25-34 | $3.00 |
| — | — | — | — | | auction-10% |
| msn.com – | | — | Below the fold | | auction |

When executing an auction between an impression inventory buyer and seller with this trade in place, the buyer's campaign information can be matched with the rate card. The implementation can make the rate cards simple to manage and understand and allow the editing of the rate terms via the UI. In some implementations, rows of attributes are mutually exclusive, such that there are not two rates for the same set of targeting attributes. In other implementations, the rows in the rate card are ordered, so if an exact attribute match for inventory being purchase or bid on is not available, then a next-best match based on a predetermined structure can be used.

In one implementation, a seller can offer either or both RON and each individual site for different prices. In another implementation, pricing is set based on how the buyer is buying. For example, in addition to setting a seller's "Entertainment" categorized impressions at $2 CPM, the price can be made conditional; e.g., when the buyer targets "Entertainment," a seller's Entertainment-categorized impression is $2 CPM; else it is a standard price.

When a potential impression inventory buyer is looking to do performance or audience buying, it may want granular inventory targeting on as much inventory as possible for maximum scale. The buyer may also want to be able to report on where the campaign served in order to pinpoint high- or low-performing pockets of inventory for manual optimization. In some cases, if a buyer learns that it is missing out on inventory because a seller's domains or categories are intentionally obscured from them, they may be willing to change their behavior to gain visibility into particular attributes associated with the inventory.

To address this problem, one implementation of the impression inventory trading platform provides buyers with granular targeting and reporting for performance or audience buying purposes and ensures sellers can obtain funds for their inventory, protect against channel conflict, and artificially differentiate from run-of-exchange buying. Via the platform, a buyer can negotiate with a seller to be given visibility into all or a subset of attributes associated with impression inventory, such as: all or selected content categories, all or selected domains, full or partial URLs, age, gender, other demographics, tags, publishers, fold position, and/or floors. In exchange, a seller can obtain a benefit such as a minimum spend commit across the seller's inventory and/or a price floor for the buyer's bids on particular inventory.

In one implementation, the trading platform UI displays to buyers the most important sellers in a market with a status for each seller showing whether the buyer has access to seller domains and categories, and/or to other attributes associated with impression inventory. The UI can further show how each buyer ranks against other buyers in terms of access to supply. In another implementation, the trading platform UI displays to sellers the buyers with whom the sellers have trading relationships. Top buyers and sellers in a market can be shown based on how many relationships they have, and email or other notifications can be sent to highlight new partners that are joining the market. This display screen in the platform UI can be market-focused, so if a member only does business in a certain country or region, it will not see members that do not overlap.

In some other systems, all sellers have "undisclosed" auction visibility, meaning that buyers can't see the auction floor prices the seller has set and therefore can't determine if the auction is truly second-price. If the seller and buyer negotiate a floor price in exchange for a privilege for the buyer, the buyer will want to be able to see that floor price exposed in the system so they know they're bidding enough to win impressions on the deal. Accordingly, buyers would benefit from transparency into floor pricing as well as auction mechanics. Buyers need to know at what prices they can win inventory, and certain buyers use price reduction as profit margin. Buyers also want to know that publishers are transacting fairly, so they often request a "true" second-price auction.

In one implementation, the present trading platform provides buyers with fair, cooperative auction dynamics (e.g., if a buyer bids what it believes an impression is worth, the buyer can trust that the seller will price reduce), while allowing sellers to protect their differentiation and pricing in RTB. To provide buyers with a true second-price auction, the platform can allow a buyer and seller to negotiate such that the buyer is provided with visibility into the auction floors. For example, the buyer can propose to a seller that there should be no hard floors and no soft floors, or that the buyer should be given visibility into a hard floor and/or soft floor. In exchange, the platform allows the buyer to offer a benefit to the seller, e.g., make a commitment to ensure the seller receives a minimum spend commit for RON (or an opportunity not to lose spend from the buyer).

Ultimately, the disclosed systems and methods provide value for each player participating in the market. Trading desks can use their resources to negotiate favorable terms and create exclusive relationships, while large strategic sellers can negotiate the terms of their auction, have deeper relationships with buyers, control how buyers are buying, negotiate auction dynamics and inventory attribute visibility, and obtain soft commits to sell inventory at higher prices. Packagers using the trading platform can gain ways to merchandise their inventory to buyers in exchange for advantages like increased spend.

FIGS. 1-13 illustrate example functionality of the system via UI screens of the trading platform according to one implementation. The UI allows clients to negotiate terms for buying and selling impression inventory in, for example, an RTB setting. Once negotiation of a deal has been completed and is actively being filled, both buyer and seller are given visibility into the performance of the deals via the UI.

Figure 2:
FIG. 2 is an example user interface screen displaying partner information for an impression inventory buyer.

FIGS. 1 and 2 provide example user interfaces for viewing a list of a platform member's partners ("Partner List"). FIG. 1 depicts a seller's view and FIG. 2 depicts a buyer's view of the "Partner List" screen. Goal tracking is displayed for each specific partner, if a goal is set (e.g., a desired spend goal). The buyer or seller can access further details for a particular partner by clicking on the "View Partnership" button associated with the partner. As shown in FIG. 1, a seller can also edit its standard terms for the sale of impression inventory. Further, as shown in FIG. 2, notifications of new proposals from sellers (e.g., proposed terms for the sale of impression inventory) can be displayed to the buyer.

Figure 3:
FIG. 3 is an example user interface screen for an impression inventory seller to view and interact with standard transaction terms.

FIG. 3 shows an example user interface for a seller viewing and interacting with standard transaction terms, and FIG. 4 shows an example user interface for a seller viewing and specifying custom transaction terms. The user interfaces for a buyer viewing and interacting with standard and custom transaction terms can be substantially similar. Terms can be a central feature of marketplace relationships. Once a relationship is negotiated, an impression inventory seller proposes terms that a buyer can decide to trade on, or not. The terms pages are where both partners can view the current trade relationship. Using the interface, a seller can set standard terms for all buyers across the online advertising platform, and can also set custom terms for particular buyers and/or groups of buyers.

The term interface screens can include information associated with the particular partner being viewed (e.g., contact information, website, logo, etc.), and an "Activity Stream" that displays messages and alerts between the user and the partner being viewed. The interface can further display a goal (e.g., spend) of the partnership terms, if any; the targeting access made available by the seller to the buyer in the partnership (e.g., impression inventory attributes); and the rates made available by the seller to the buyer to trade on in the partnership. The interface can also display various messages and alerts about the terms being viewed in context to how that terms page was reached (e.g., proposed terms, accepted terms, rejected terms, etc.).

Figure 5:
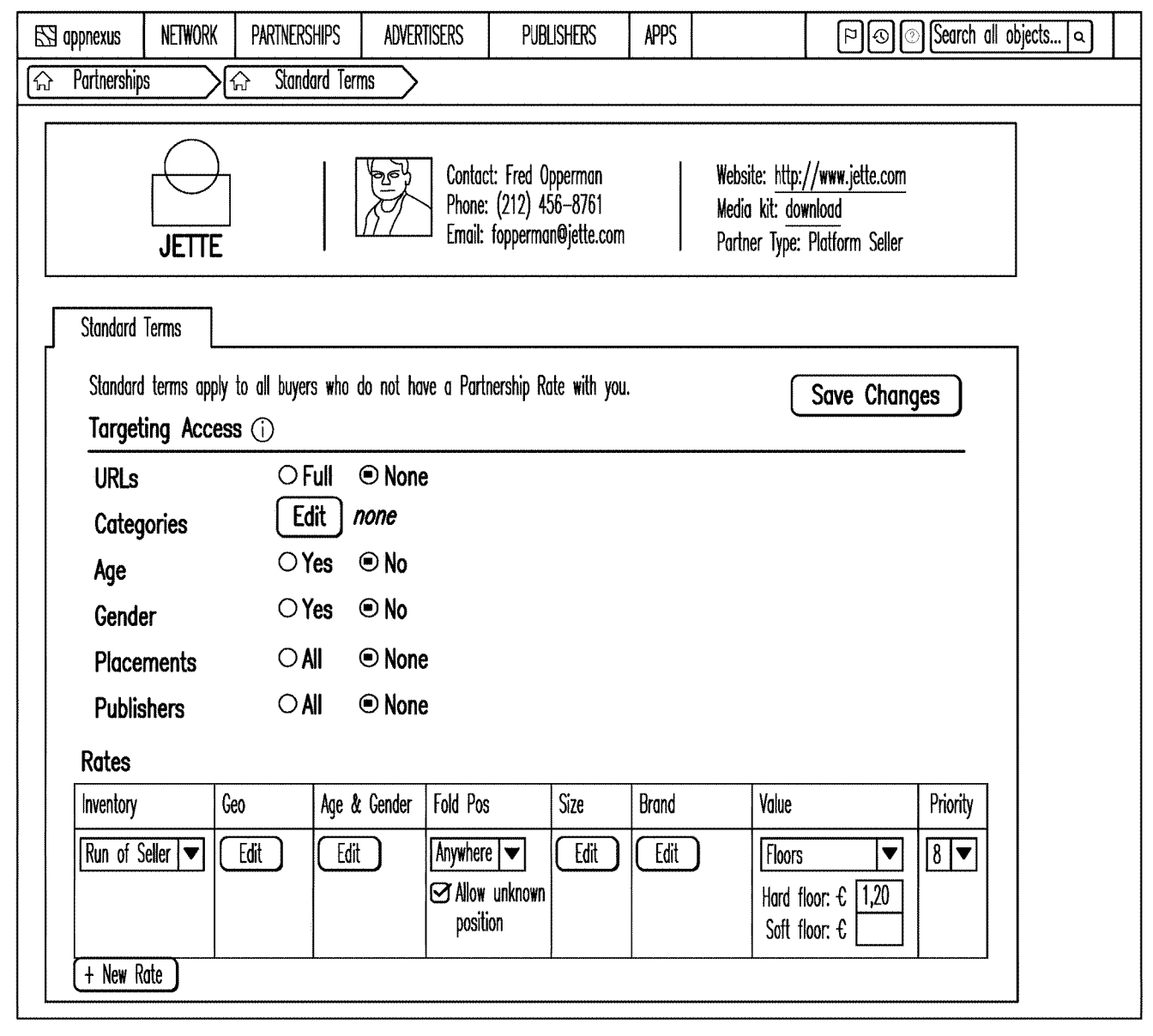
Figure 6:
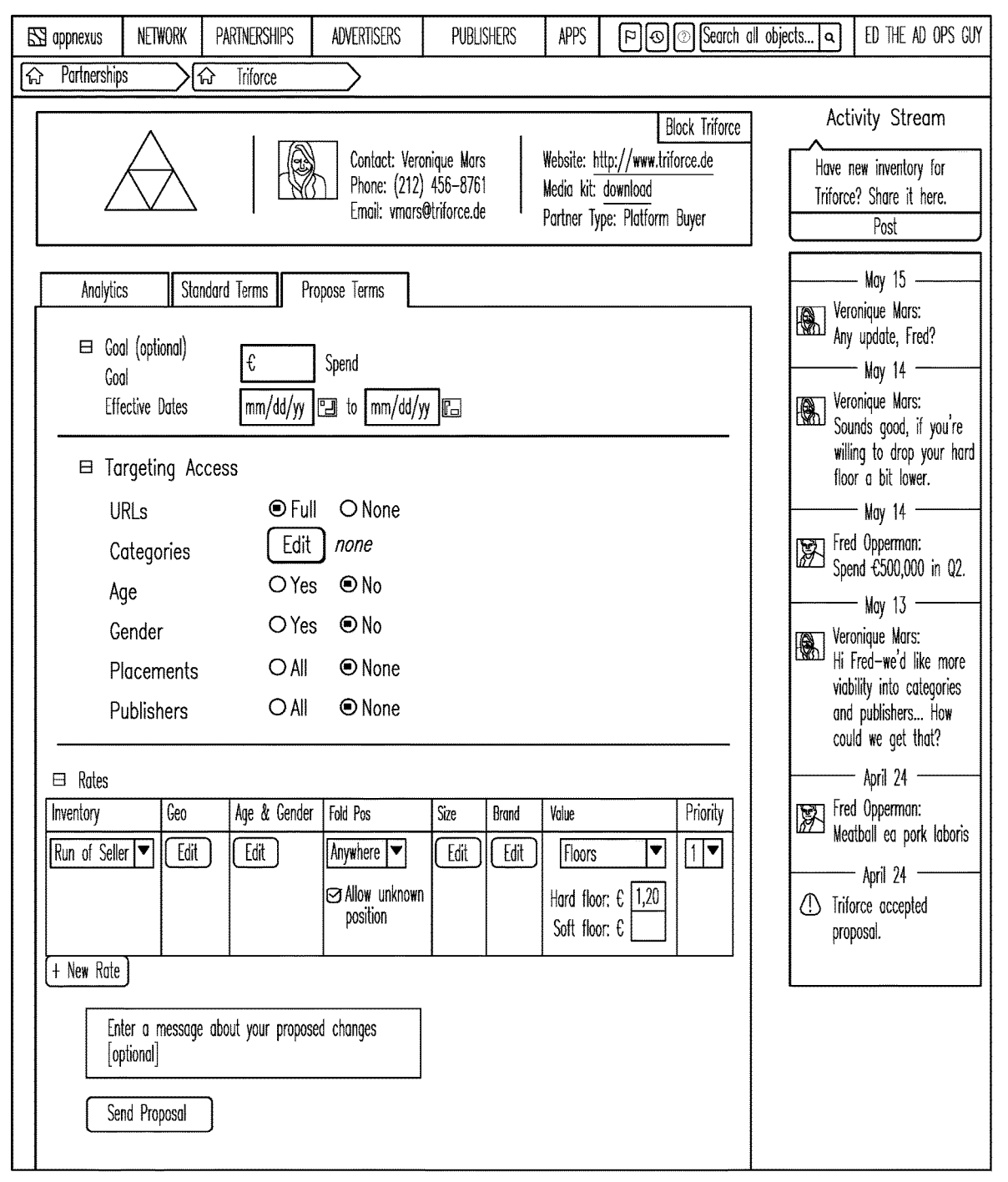

FIGS. 5 and 6 depict example user interfaces for editing deal terms by an impression inventory seller and buyer, respectively. Terms editing is how deals are set into action across the online advertising platform, such that some or all partners can trade according to set terms. The "Term Editing" screens can include information associated with the partner being viewed (e.g., contact information, website, logo, etc.) and an Activity Stream that displays messages and alerts between the user and the partner being viewed. An editing view of the terms page to allow for editing of individual can be included. In certain implementations, only a seller can modify terms using the editing view, whereas in other implementations, both parties can propose terms to the other party and/or modify terms of the other party's proposal to form a counterproposal using the editing interface. Sellers and/or buyers can edit the targeting access fields (shown as binary options) and/or the rate terms (shown as permitting complex options such as include/exclude, multi-select fields, drop-down selection boxes, and text-field options). A seller and/or buyer can also optionally add a goal to the partnership (e.g., spend over a period of time), and can optionally include a message to the other party about particular terms or proposed term changes.

Figure 7:
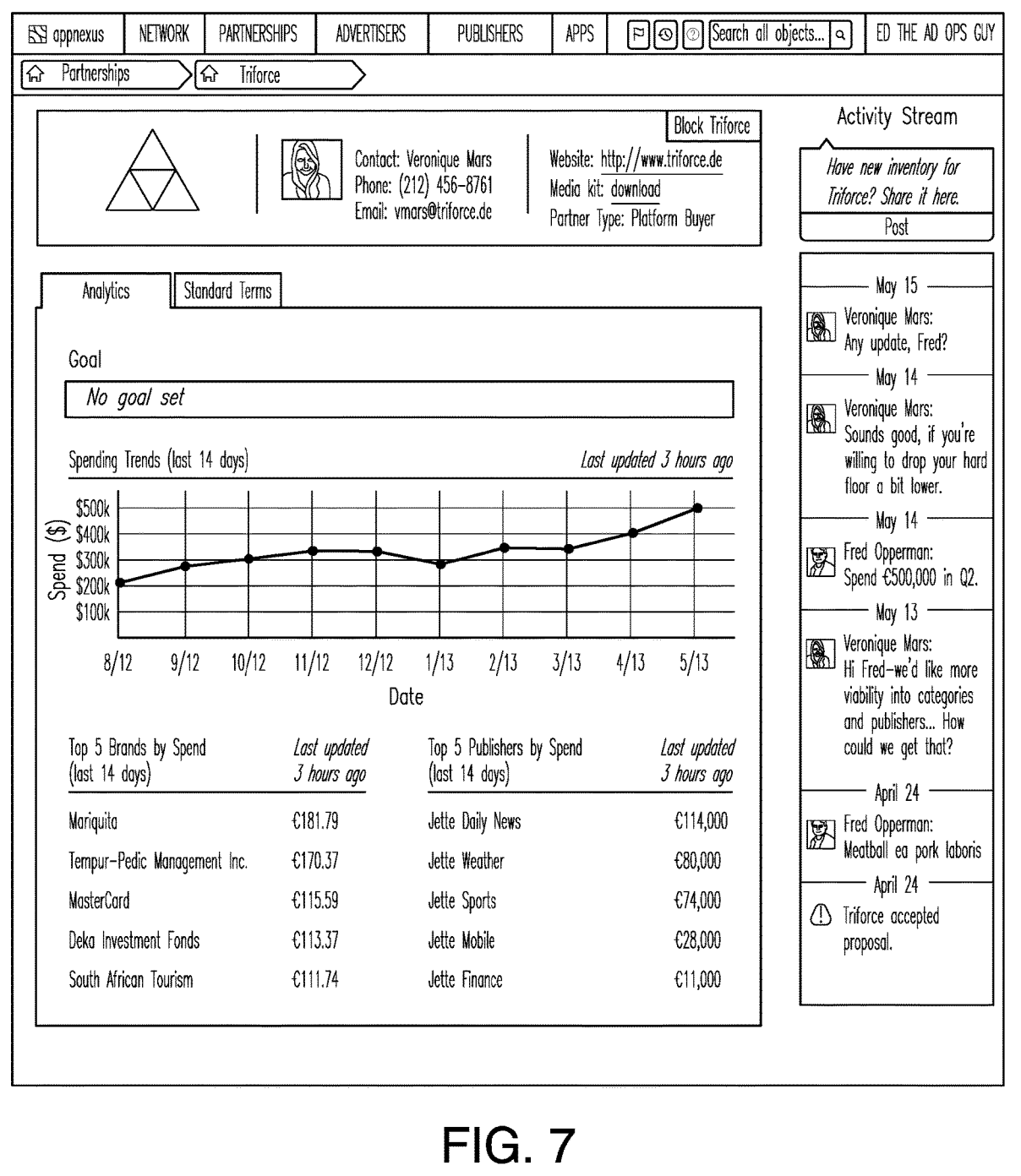

FIG. 7 illustrates an example user interface for viewing analytics by a buyer or seller platform member. The "Analytics" screen shows detail about the partnership between the buyer and seller and allows both parties to gauge how well the partnership is doing and where there can be improvements, deals, or changes made. The "Analytics" screen can include information associated with the partner being viewed (e.g., contact information, website, logo, etc.) and an Activity Stream that displays messages and alerts between the user and the partner being viewed. The interface can display the goal, if specified, that shows how the partner is performing in terms of, for example, a set spend goal during a particular time period. As shown, a graph can track spending trends such as how much the buyer has spent on the seller's inventory during the displayed time period. The interface can also display top brands by spend (e.g., the buyer's top five spend of brands (ad brands) on the seller's inventory during the displayed time period), top publishers by spend (e.g., the buyer's top five spend on the seller's publishers (websites) during the displayed time period), and other rankings.

Figure 8:
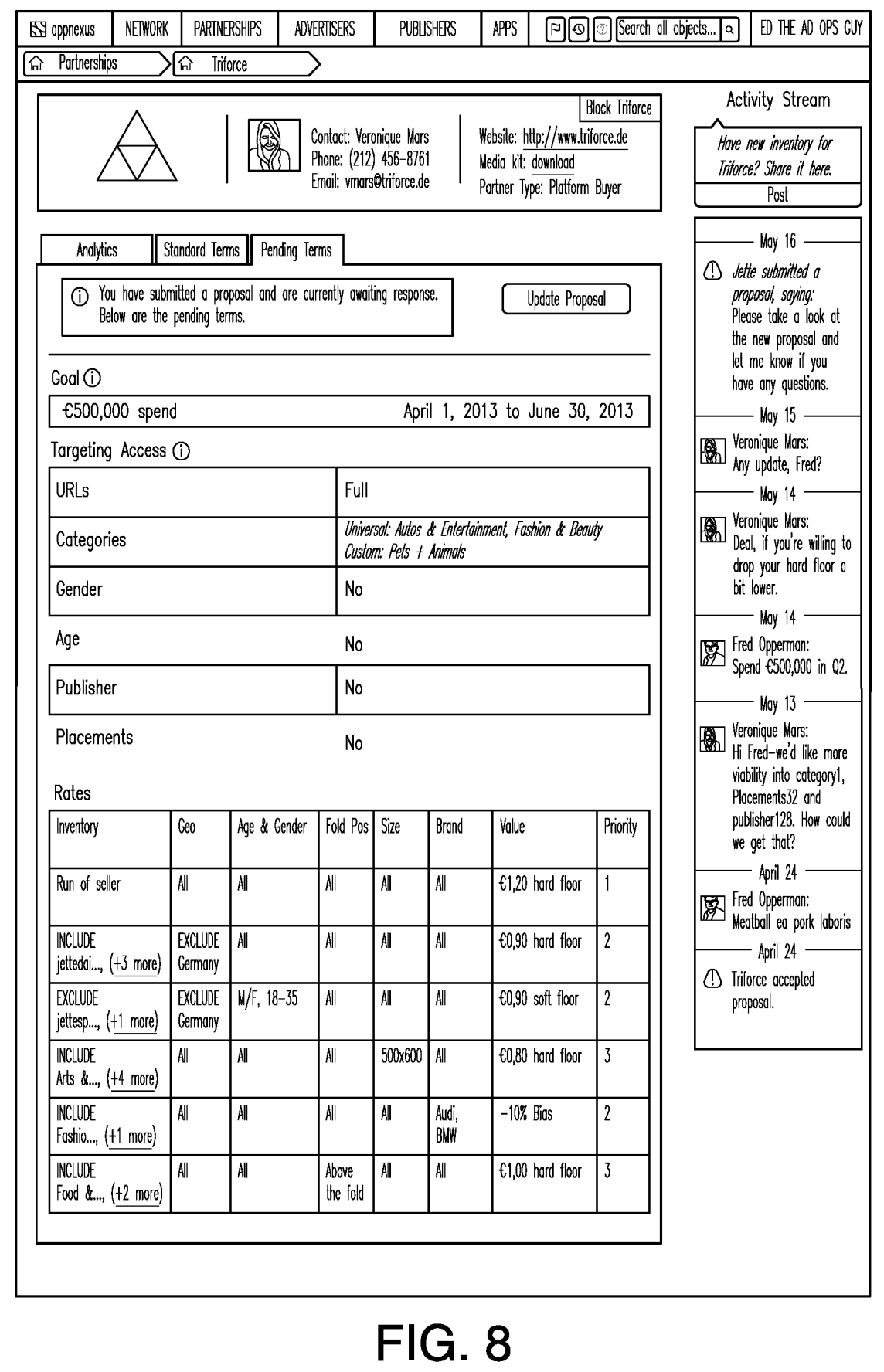
Figure 9:
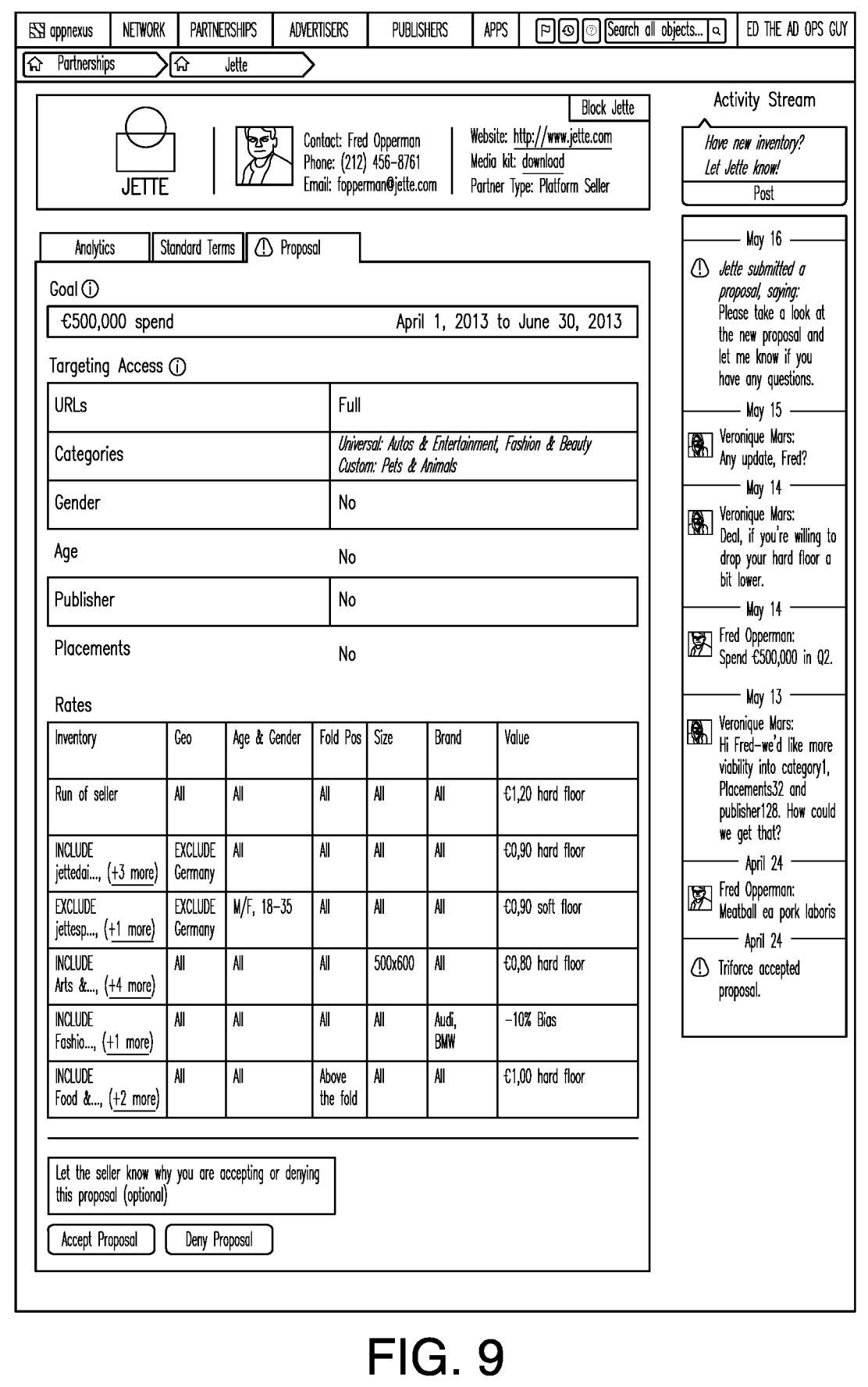

FIGS. 8 and 9 provide example user interfaces for a buyer and seller, respectively, to view pending terms. The "Pending Terms" screens are where negotiation initiated through the trading platform occurs, and buyers and/or sellers can accept or deny proposals made by the other party via these interfaces. The "Pending Terms" screens can include information associated with the partner being viewed (e.g., contact information, website, logo, etc.) and an Activity Stream that displays messages and alerts between the user and the partner being viewed. The "Pending Terms" screens can also display the proposed goal of the partnership terms, if any; proposed targeting access made available by the seller to the buyer in the partnership; and proposed rates made available by the seller to the buyer to trade on in the partnership. Changes between standard, originally proposed, and/or previously proposed terms can be highlighted or otherwise identified. In some implementations, the buyer and/or seller can optionally further modify the proposed terms, and the other party can accept or deny the terms and include a message to the proposing party.

Partner with Buyers

As discussed above, the present systems and methods can be used by buyers and sellers to foster and manage relationships with each other. In particular, sellers can: (1) use the present system to communicate with buyers and negotiate a trade directly in a console using an Activity Stream; (2) leverage targeting access for higher impression prices and/or more overall spend; (3) more easily create a trade with a specific buyer, setting the yield management and visibility settings discussed with the buyer in one place; (4) achieve higher fill rates and revenue with trade terms that the buyer can see and has agreed to; and (5) track revenue from a specific buyer to gain insight into the partnership and trends.

Partner Center Screen—Seller View

Figure 10:
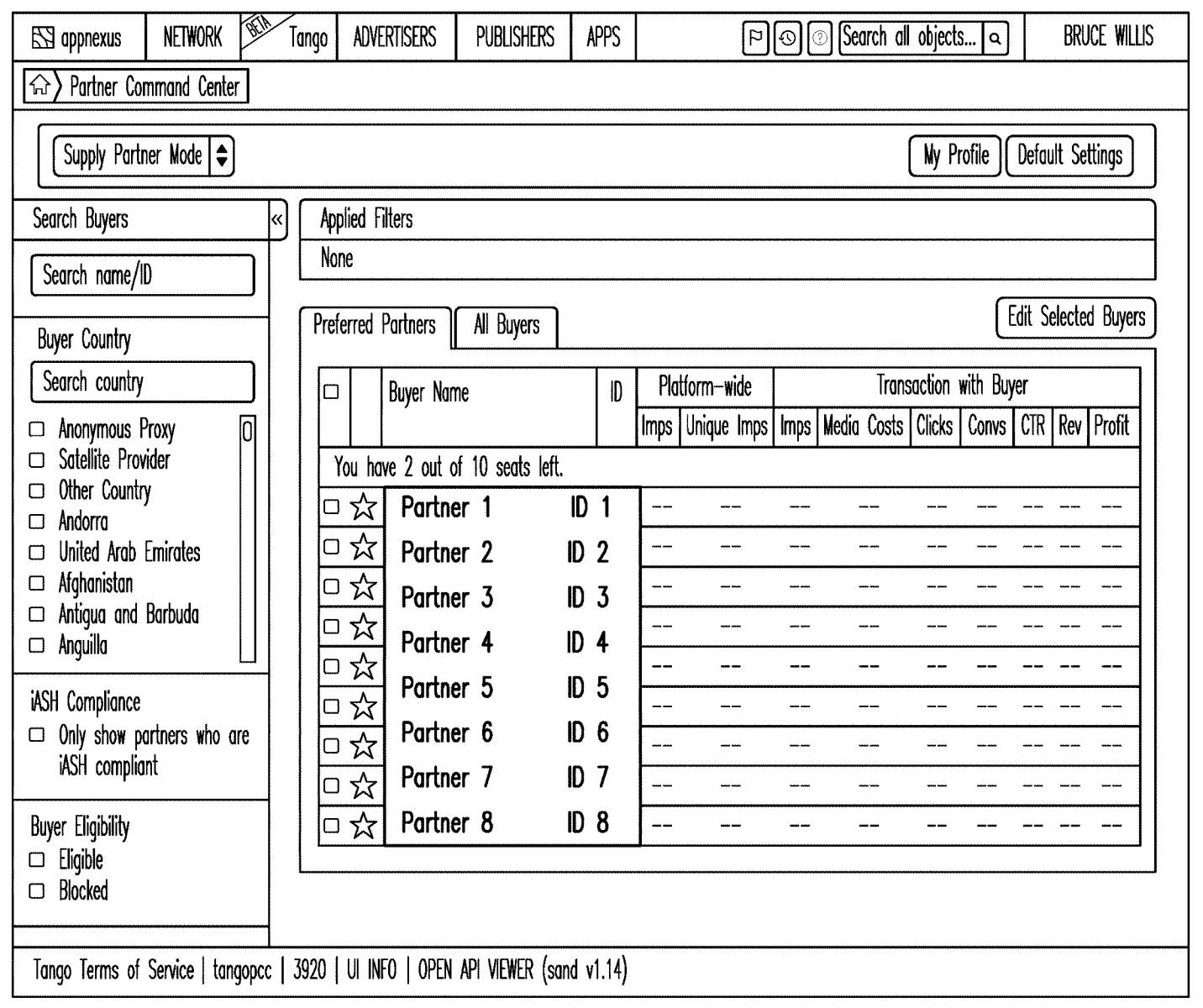

Providing further detail to the example UI screen in FIG. 1, FIG. 10 illustrates another implementation of a "Partner Center" screen for a seller. On the "Partner Center" screen, a seller user can view preferred partners, search all buyers, manage a profile, manage default buyer settings, and review impression and click statistics for each buyer. If the seller is in a network that also represents demand partners, a partner mode dropdown box will be displayed, and the seller can select "Demand Partner Mode" from the dropdown in order to view the "Partner Center" screen as a demand partner looking for supply partners.

The "My Profile" button can be clicked to edit the information that demand partners will see on a "Partner Details" page associated with the seller. The profile can provide information about the seller's company, which helps demand partners understand how the seller may be useful as a partner. The "My Profile" dialog also displays an overview of the audit quality of the user's inventory. The seller can see how much of its inventory has been self-audited (seller-reviewed) and how much has been audited by the online advertising platform provider (platform-reviewed).

A seller can also establish default buyer eligibility, allowed deal types, and targeting access settings for all demand partners within the "Default Settings" dialog. In some implementations, the seller can override the foregoing settings for individual demand partners.

The "Default Buyer Eligibility" setting in the "Default Settings" dialog allows the seller to ban a particular member. If "eligible," the seller can sell inventory to this partner buyer, because the ads the partner would like to serve have proven trustworthy (i.e., the partner's ads meet the seller's ad quality requirements). If the seller specifies the partner as "eligible," the seller can define the payment methods that it will accept and the targeting information it will provide. If the partner is specified as "blocked", the seller declines to sell any inventory to this member for any number of reasons. For example, the seller may have a direct relationship with a buyer and wishes to avoid allowing them access to the seller's inventory at a potentially lower price via real-time bidding.

The "Default Allowed Deal Types" setting in the "Default Settings" dialog indicates the type(s) of payment the seller accepts from eligible partners. In one implementation, "CPM" is selected by default for all eligible buyers. The seller can also opt into allowing members to pay for inventory on a CPC and/or CPA basis. If the seller allows CPC and/or CPA payment, the seller can also set up publishers to accept CPC and CPA deal types.

The "Default Targeting Access" setting in the "Default Settings" dialog indicates the visible attributes each member receives by default when targeting inventory. The more information a seller gives to buyers, the more easily they can target the seller's inventory. The seller can provide default access to none, some, or all of the following attributes:

URLs (Full or Domain)—Expose domains to allow members using white lists or Research Available Inventory to more easily target the seller's inventory.

Category (Universal)—Expose information provided by the seller (when creating a placement) and allow members to target via universal content categories.

Category (Custom)—Expose custom content categories to grant buyers the ability to target customized slices of inventory that the seller has collected into a category.

Age—Expose information provided by the seller (e.g., using an age macro when exporting a placement) and allow members to target by age or age range.

Gender—Expose information provided by the seller (e.g., using a gender macro when exporting a placement) and allow members to target via gender.

Placements—Expose the placement name to allow buyers to more easily target a specific advertisement placement.

Publishers—Expose a publisher's name and ID to allow buyers to more easily target a specific publisher.

The "All Buyers" tab in FIG. 10 lists all buyers (both platform members and external bidders). Each buyer's member name and ID can be displayed along with platform-wide and buyer transaction statistics (e.g., impressions, unique impressions, media costs, clicks, conversions, click-through rate (CTR), revenue, and profit). The "Platform-wide" columns display statistics on all of the buyer's transactions across the platform over a period of time (e.g., the past 30 days). The "Transactions with Buyer" columns display statistics on a seller's transactions with the buyer over a period of time (e.g., the past 30 days).

Platform-wide statistics can include "Imps" (the number of impressions that the buyer has purchased across the entire platform) and "Unique Imps" (the number of impressions that can be attributed to unique users purchased across the entire platform). The buyer transactions statistics can include "Imps" (the number of impressions that the buyer has purchased from the seller), "Media Costs" (the cost of all of the impressions the buyer has purchased from the seller), "Clicks" (the number of clicks that were generated from inventory that was purchased from the seller), "Convs" (the number of conversions that were attributed to inventory that was purchased from the seller), "CTR" (the buyer's click-through rate on the seller's inventory), "Revenue" (the amount of revenue that the seller earned from the buyer), and "Profit" (the amount of profit that the seller earned from the buyer).

The seller can use the interface to search for buyers to locate a specific type of buyer, and can then review the statistics associated with the buyer to determine if the seller would like to partner with the particular buyer. The seller can use filters to search the "All Buyers" list for a buyer that meets the seller's partnership needs. The list of buyers can be filtered by, for example, name/id (a specific buyer's name or member ID), primary country (the country in which the buyer has the most spend), iASH compliance (buyers who are iASH compliant), buyer eligibility (eligibility settings defined for buyers by the seller), allowed deal types (deal types the seller has allowed for buyers), targeting access (targeting access the seller has exposed to buyers), and creative audit status (the creative audit status allowed from buyers).

In one implementation, a seller can set preferred buyers via the UI. For example, the seller can mark a number (e.g., ten) of buyers with whom the seller has a significant partnership by clicking on the prefer icon (star) next to their names. These partners are then displayed within the "Preferred Partners" tab. The seller can add partners that the seller frequently works with, wants to monitor regularly, or has a personal relationship with in order to keep them easily visible. The member name and ID of preferred buyers can be displayed along with each buyer's platform-wide statistics and statistics regarding the seller's transactions with the buyer.

A seller can also click on a buyer's name (whether in the "Preferred Partners" tab or the "All Buyers" tab) to view the "Partner Details" screen in which the seller can review and manage a relationship with a specific buyer. The seller can view spending trends, privileges allowed for the buyer, and active, upcoming and pending deals. The "Partner Details" section is where the seller can create a new deal, export a deal, cancel a deal, and/or duplicate a deal.

Customizing the Seller Profile

On the "Partner Center" screen, a seller can edit the profile information that will be displayed to demand partners on the "Partner Details" page. Basic information about the seller can include ID (the unique identification number for the member), name (the member's name), partner type (the type of partner the member is within the platform), buyer status (a member that buys inventory through the platform), and seller status (a member that sells inventory through the platform).

The profile can contain other information, such as contact name, contact title, phone, email, company website, address, country, and company information. The seller can also elect to have the same information shown when another seller is viewing the seller's buyer profile, if the seller has such a profile. The profile can also contain an "Inventory Trust" chart, where a user can view an overview of the audit quality of the profile owner's inventory. A user can see the number of impressions as well as the percentage of the inventory that has been self-audited (seller-reviewed) or audited by the online advertising platform (platform-reviewed). The statistics for the inventory can include audited and unaudited inventory.

Editing Specific Buyer Settings

A seller can determine the buyer eligibility, allowed deal types, and targeting access settings for one or more specific demand partners, similarly to setting default buyer settings as described above. A seller can select the eligibility to apply to the partners, thereby indicating whether the seller's inventory is available (eligible) to a buyer, or not (blocked). A seller can choose the "Default" setting if it wants the selected demand partners to continue to follow the default value. A seller can also change the allowed deal types, i.e., the payment types the seller is willing to accept from the partners. For example, the seller can select CPC, CPA, and/or CPM. A seller can also change the targeting attribute access by selecting the information that should be exposed to the specific buyer partner when it is targeting the seller's inventory. Specific partners can be allowed access to, for example, domain URL, category, age, gender, placement, publisher targeting information, and/or other attributes as described herein. The more information given to demand partners, the more easily they can target inventory.

Partnership Details Screen—Seller View

Figure 11:
FIG. 11 is an example user interface screen for viewing partner performance, privileges, and deals.

Referring now to FIG. 11, on the "Partnership Details" screen a seller partner can review and manage a relationship with a specific buyer by tracking overall revenue trends, viewing the buyer's top brands on the partner's inventory, viewing the top publishers for the buyer, viewing the privileges the partner has granted for the buyer, viewing active and upcoming deals, and creating new deals. The seller can view information the buyer has provided, including the main contact's name, phone number, and email address, and a description of the buyer's business. The partner can contact the buyer directly. If the buyer has not entered its contact's name, phone number, email address, or a description of its business, then this information will not be available.

The seller partner can view statistics in the "Dashboard" tab to see how the buyer is performing on the seller's inventory. These statistics can be updated periodically (e.g., every 24 hours). The graph and tables can update at separate times; therefore text at the top of each section can note when the last update occurred. A "Revenue" graph can display revenue from all transactions between the seller and the buyer within the last, e.g., 90 days. The seller can use this graph to monitor the buyer's activity on the seller's inventory. If the buyer is targeting an active deal, this graph can help give insight into the deal's effectiveness. There can be a data point for every day, and the seller can hover over a data point to see the date it represents, along with the amount of revenue and impressions for that day.

Further, a table can list the buyer's top brands that have purchased the seller partner's inventory, listed in order from most to least revenue. This information indicates which of the buyer's brands are performing best on the inventory. Another table can list the seller partner's top publishers that the buyer has purchased inventory from, listed in order from most to least revenue. This information indicates which publishers are performing best with the buyer.

Messages between the seller partner and the buyer can be displayed in the "Activity Stream," along with the number of days since the message was posted. Sellers can use the Activity Stream to introduce themselves to a new buyer, discuss terms for a new deal with the buyer, check in with the buyer to see how a deal is working for them, or discuss why a deal isn't working for the user. System messages and other status messages (e.g., proposal accepted, proposal declined) can also display in the Activity Stream. In the Activity Stream, a seller partner can send a buyer a message by typing into the field at the top of the section, and then clicking "Post"; view last update information (text at the top of the section will note when the Activity Stream was last updated); and hide the Activity Stream.

Figures 12, 13:
FIG. 12 is an example user interface screen for managing partner privileges.
FIG. 13 is an example user interface screen for managing partner deals.

Seller partners can view and manage the buyer's targeting access privileges within the "Partner Privileges" tab, shown in FIG. 12. In some implementations, the buyer can also view the "Partner Privileges" tab in a buyer view where the buyer can see what impression inventory attributes the seller has exposed to and hidden from the buyer, such as URLs (full or domain), customer or universal categories, age, gender, placements, and publishers. The seller can also update the buyer's targeting access settings through the "Partner Privileges" tab.

A seller partner can view deals with a buyer (historical and current deals) in the "Granular Deals" tab, shown in FIG. 13. Each deal can be displayed with additional details such as name (a name entered for the deal), ID (the deal identifier), owner (the first and last name of the seller user that created the deal), description (a description for the deal), effective dates (the start and end dates for the deal), inventory (the inventory that the deal will apply to, where the seller can select "Run of Seller" for the deal to apply to the seller's entire inventory, "Category" for the deal to apply to selected universal and/or custom categories, or "Publisher" for the deal to apply to selected publishers), segment (the segment that the deal will apply to), size (the impression size that the deal will apply to), brand (the brand that the deal will apply to), type (the auction type), and value (the floor price, if any, associated with the deal). Deals that have been canceled or have expired are displayed within the "Inactive" section.

A seller partner can negotiate a deal that meets the seller's and the buyer's needs using the Activity Stream, and then clicking "Create Deal" in the Granular Deals tab to create the deal. Active and upcoming deals can be edited at any time. The seller can click anywhere in the row of the deal to update, and the deal's fields will become editable. Sellers can also cancel and export deals.

Partner with Sellers

As a buyer, the present system can be used to communicate with sellers and negotiate a trade directly using the Activity Stream; leverage more overall spend for targeting access and/or lower impression prices; and track spend on a specific seller's inventory to gain insight into the partnership and trends.

Partner Center Screen—Buyer View

The "Partner Center" screen for buyers can be substantially similar to the "Partner Center" screen for sellers, as depicted in FIG. 10, with textual elements and interface controls referring to "sellers" instead of "buyers." On the "Partner Center" screen, a buyer can view preferred partners, search all sellers, and review impression and click statistics for each seller. A buyer can edit profile information that supply partners will see on the buyer's "Partner Details" page. The buyer partner profile provides information about the buyer's company, which helps supply partners understand how the buyer can be useful as a partner.

Buyers can establish default seller eligibility and inventory trust settings for all supply partners within the "Default Settings" dialog. Similar to seller default settings as described above, it is possible to override the default settings for individual supply partners.

The "Default Seller Eligibility" setting indicates whether a seller's inventory is available (eligible) or unavailable (blocked). If eligible, the buyer can buy inventory from this seller partner, because at least a portion of the inventory the seller makes available has proven trustworthy (e.g., the inventory portion meets required category and sensitivity attributes). If blocked, the buyer will not buy any inventory from this seller for any number of reasons. For example, the seller may have a history of providing misleading domain information when making inventory available for bids, and the buyer wishes to avoid serving on any domains offered by this seller.

If the seller eligibility is set to "eligible," this indicates that the buyer considers at least some of the inventory from that partner to be acceptable for an impression, though this need not be an all-or-none decision. The buyer can define which portion of the seller's inventory is trusted. In one implementation, there are three trust levels (listed from least trusted to most trusted). The first level, "platform-reviewed," indicates that the buyer trusts only the inventory that has been audited by the online advertising platform. The domain-level platform review can include review of categories, sensitive attributes, and intended audience. This is the lowest level of trust and offers the fewest options (domains) in which to serve impressions, but provides the highest level of assurance that ads will not be served on questionable sites. The second level, "seller-reviewed," indicates that, in addition to all platform-reviewed inventory (above), the buyer also trusts inventory audited by the seller. This expands the number of domains on which an ad can serve, but requires confidence in the review process and standards of the seller. The third level, "all," indicates that the buyer is comfortable serving ads on any domain sent to the buyer by this supply partner. This allows access to all domains, but expands the possibility that an ad will be served on a questionable or inappropriate site.

The "All Sellers" tab on the buyer's "Partner Center" screen can display all sellers, both members and external suppliers. The member name and ID of each seller is displayed along with statistics associated therewith. The "Platform-wide" columns display statistics on all of the seller's transactions across the platform, whereas the "Transactions with Seller" columns display statistics on transactions with the particular seller.

Platform-wide statistics can include "Imps" (the number of impressions the seller has sold across the entire platform) and "Unique Imps" (the number of impressions shown to uniquely identifiable users the seller has sold across the entire platform). The seller transactions statistics can include "Imps" (the number of impressions that the buyer has purchased from the seller), "Media Costs" (the cost of all of the impressions the buyer has purchased from the seller), "Clicks" (the number of clicks that were generated from inventory that was purchased from the seller), "Convs" (the number of conversions that were attributed to inventory that was purchased from the seller), "CTR" (the buyer's click-through rate on the seller's inventory), "Revenue" (the amount of revenue that the seller earned from the buyer), and "Profit" (the amount of profit that the seller earned from the buyer).

Buyers can search for sellers to find a specific type of seller and then review the statistics to determine if they would like to partner with the seller. A buyer can use filters to search the "All Sellers" list for a seller that meets the buyer's partnership needs. The list of sellers can be filtered by, for example, name/id (a specific seller's name or member ID), primary market (the country in which the seller has the majority of its inventory), iASH compliance (sellers who are iASH compliant), seller eligibility (eligibility settings defined for sellers by the buyer), and inventory trust levels (inventory trust levels the buyer has defined for sellers.

A buyer can mark sellers with whom the buyer has a significant partnership by clicking on the prefer icon (star)

next to the seller's name. These seller partners will then be display within the "Preferred Partners" tab. The buyer can add sellers that the buyer frequently works with, wants to monitor regularly, or has a personal relationship with in order to keep them easily visible. The member name and ID of each seller can be displayed along with the sellers' platform-wide statistics and statistics regarding transactions with the sellers.

The buyer can click on a seller partner's name to view the "Partner Details" screen where the buyer can review and manage a relationship with a specific seller. The buyer can view spending trends and active, upcoming, and pending deals. The "Partner Details" screen is where the buyer can accept or decline a new deal, export a deal, and/or cancel a deal.

On the "Partner Center" screen, the buyer can edit the profile information that will be displayed to supply partners on the "Partner Details" page, in a similar manner as for sellers and seller profiles, described above.

The buyer can specify the seller eligibility and inventory trust level settings for one or more specific supply partners (i.e., overriding the default settings). As described above, the eligibility setting indicates whether a seller's inventory is available (eligible) or not (blocked).

The buyer can also hover over the seller's name for an overview of the audit quality of the seller's inventory. The interface shows the number of impressions as well as the percentage of the seller's inventory that has been audited by the seller (seller-reviewed) or audited by the online advertising platform (platform-reviewed). The statistics available to the buyer can include both audited and unaudited inventory. The buyer can select the inventory trust level to apply to the partners, thereby indicating whether the buyer trusts inventory reviewed only by the platform, by the platform and the seller, or all inventory. The buyer can also select the default setting to have the selected supply partners to continue to follow the default value.

Partnership Details Screen—Buyer View

Similarly to the seller "Partnership Details" screen shown in FIG. 11, a buyer can review and manage a relationship with a specific seller via a buyer "Partnership Details" screen. The buyer can track overall spend trends, view top brands on a seller's inventory, view a seller's top publishers from whom the buyer partner has purchased inventory, view active and upcoming deals, and communicate with a seller to negotiate a deal. The buyer can also view information the seller has provided, including the main contact's name, phone number, and email address, and a description of the seller's business. The buyer can contact the seller directly by sending a message within the Activity Stream.

The buyer partner can view statistics in the "Dashboard" tab to see how the buyer's campaigns are performing on the seller's inventory. These statistics can be updated periodically (e.g., every 24 hours). The graphs and tables available to the buyer can update at separate times; therefore, text at the top of each section can note when the last update occurred. If the buyer has not purchased any inventory from the particular seller, there will be no information to display in graphs and tables.

A "spend" graph can display spend from all transactions between the buyer partner and the seller within, e.g., the last 90 days. The buyer can use this graph to monitor activity on the seller's inventory. If the partner is targeting an active deal, this graph can help give the buyer insight into the deal's effectiveness. The buyer can hover over a data point for a particular day to see the date it represents, along with the spend amount for that day.

In one implementation, a table lists the top brands that have purchased inventory from the seller, listed in order from most to least spend. This information tells the buyer which of its brands are performing best on the seller's inventory. Another table can list the seller's top publishers from whom the buyer has purchased inventory, listed in order from most to least spend. This information informs the buyer on which of the seller's publishers it is performing best.

Messages between the buyer partner and the seller are displayed in the Activity Stream, along with the number of days since the message was posted. The buyer can use the Activity Stream to introduce itself to a new seller, discuss terms for a new deal with the seller, check in with the seller to see how a deal is working for them, or discuss why a deal isn't working for the partner. The buyer can propose changes to a deal by sending the seller a message within the Activity Stream.

The buyer partner can view the targeting access privileges the seller has set for it within the "Partner Privileges" tab. The partner can contact the seller using the Activity Stream to request a change to its targeting access. Access privileges can be those as described elsewhere herein.

The buyer partner can view all of its deals with the seller, historical and current, in the "Granular Deals" tab. Each deal can be displayed with additional details such as those described above with respect to viewing deals. Currently active and upcoming deals can be displayed within the "Active" section. Deals that have been canceled or have expired can be displayed within the "Inactive" section.

Figure 14:
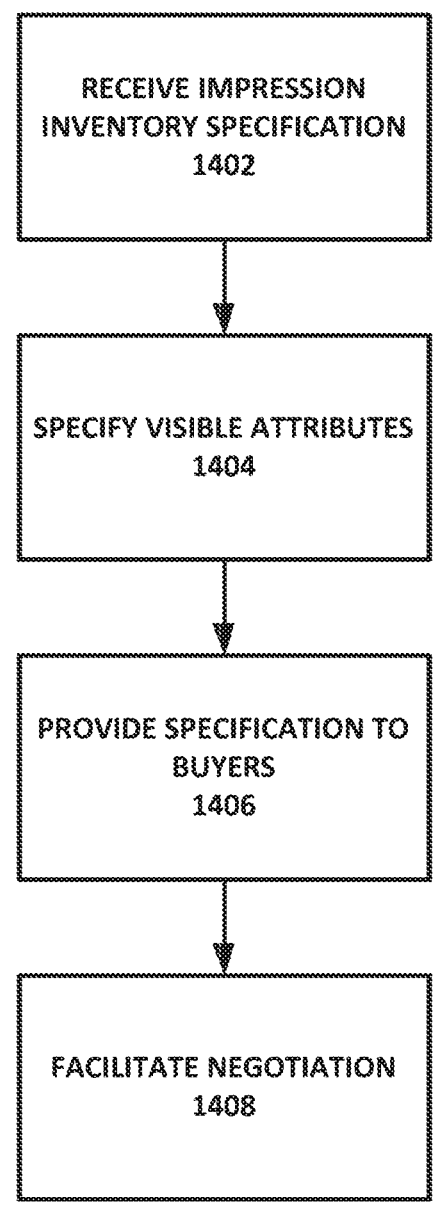
FIG. 14 is a flowchart of an example method for facilitating negotiations between a seller and a buyer on an impression inventory trading platform.
Figure 15:
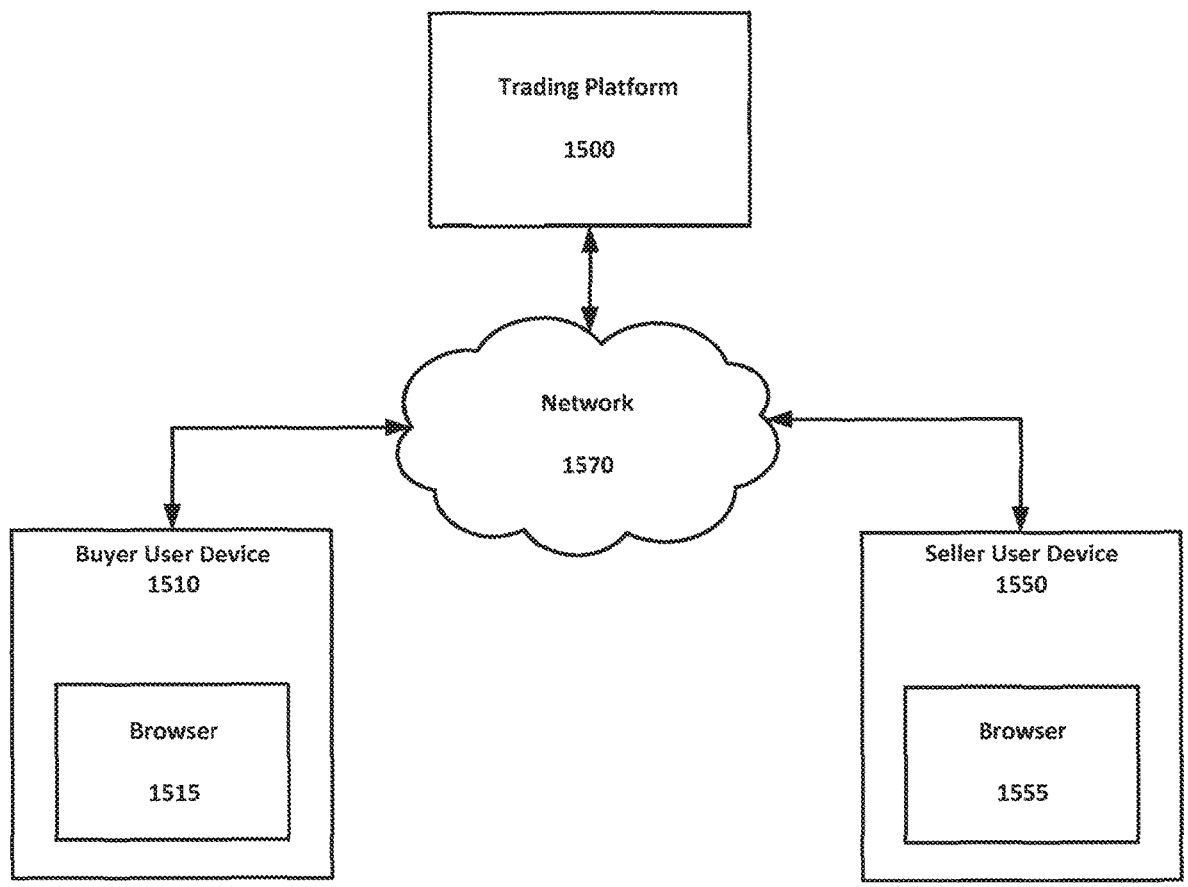
FIG. 15 is a diagram of an example system implementation for an impression inventory trading platform.

FIG. 14 illustrates an example method for facilitating negotiation between a seller and a buyer on an impression inventory trading platform, and FIG. 15 depicts an example system for implementing the techniques described herein. In STEP 1402, a specification of impression inventory for sale by an impression inventory seller is received at the trading platform 1500. The specification can include, for example, attributes associated with the inventory such as a uniform resource locator (or portion thereof), a domain, an age, a gender, a content category, an auction price floor, a geography, a tag, a publisher, or a fold position; rates associated with particular subsets of the inventory; and so on. Each attribute is specified as either hidden or visible to potential impression inventory buyers (e.g., all buyers, subset(s) of buyers, or individual buyers) (STEP 1404). The seller can specify each attribute status via the user interface of the trading platform 1500 or other API, which can be accessed using the seller user device 1550 and browser software 1555.

In STEP 1406, the impression inventory specification and visible attributes associated therewith, if any, are provided to one or more potential impression inventory buyers via the user interface of the trading platform 1500, and the platform 1500 facilitates negotiation, via its user interface, between the seller and one or more of the potential impression inventory buyers for purchase of the impression inventory (STEP 1408). The buyer and seller can access the user interface of the platform 1500 via communications network 1570 using their respective user devices 1515 and 1550 and browser software 1515 and 1555. The negotiation facilitation can include, for example, receiving a proposal at the trading platform from a potential impression inventory buyer for the seller to expose one or more hidden attributes associated with the impression inventory, and providing the proposal to the seller via the platform user interface. The proposal can include an offer to provide a benefit to the seller (e.g., a price floor for certain impression inventory or a minimum spend commitment) in exchange for the seller exposing the hidden attributes.

The negotiation facilitation can also include receiving from the seller proposed terms for the sale of the impression inventory and providing, via the platform user interface, the proposed terms to a potential impression inventory buyer. In response, the buyer can accept or reject the proposed terms, and the acceptance or rejection are provided to the seller via the user interface. The proposed terms can include, for example, a proposed rate for a sale of at least a subset of the impression inventory, or proposed targeting access to the impression inventory for the buyer.

The negotiation facilitation can also include receiving from a potential impression inventory buyer proposed terms for the purchase of the impression inventory, and providing the proposed terms to the seller via the platform user interface. The seller can accept or reject the proposed terms, and the acceptance or rejection are provided to the potential buyer via the user interface. The seller can make modifications to the proposed terms from the seller and provide, via the user interface, the modifications to the potential buyer. The process can also be performed with roles reversed; e.g., the buyer can make a counterproposal to a seller's proposed terms.

Application Programming Interface

The present trading platform can also include application programming interfaces (APIs) that provide for the implementation of the features described herein. In one implementation, an Activity Stream API service drives interpersonal communication for the user. This service can be displayed in the trading platform UI as a chat client for delivering messages from one member to another, or as a mechanism for the system to broadcast messages about the status of a deal.

In another implementation, a Partner Relationship API service facilitates the definition of who is partnered with whom, and allows for the management of terms of partners' in-flight and in-negotiation deals and corresponding goals for spend/delivery. The Partner Relationship API can provide for the ability to manipulate deal terms such as special pricing on inventory, special visibility into inventory at auction-time, and spending goals. In some implementations, the API allows a seller to: set a default policy which applies to all partners in absence of a negotiated deal to guarantee a set of base terms for how inventory is sold; send a set of proposed terms to a specific buyer for review and response to establish a preferential relationship; review a report of a buyer's spend on the seller's network; propose multiple future deals to buyers that do not have overlapping flight dates; and limit the number of active deals.

The API can allow a buyer to review proposed policies and accept or deny them with feedback, and can allow both sellers and buyers to: limit the number of active deals; limit views to relationships where the user is either seller or buyer; and negotiate the level of visibility into inventory at auction time and the rates at which inventory is sold/bought, and define the amount of spend that is transacted as part of a relationship.

Referring to FIG. 15, an impression inventory buyer and an impression inventory seller can negotiate via the trading platform 1500 using respective user devices 1510 and 1550. Implementations of the impression inventory trading platform 1500 and user devices 1510 and 1550 can utilize appropriate hardware or software and can execute, for example, on a system capable of running an operating system such as the Microsoft Windows® operating systems, the Apple OS X® operating systems, the Apple iOS® platform, the Google Android™ platform, the Linux® operating system and other variants of UNIX® operating systems, and the like.

The functionality described herein can be implemented in software and/or hardware on various devices. The user devices 1510 and 1550 can include, but are not limited to, a smart phone, smart watch, smart glasses, tablet computer, portable computer, television, gaming device, music player, mobile telephone, laptop, palmtop, smart or dumb terminal, network computer, personal digital assistant, wireless device, information appliance, workstation, minicomputer, mainframe computer, or other computing device, that is operated as a general purpose computer or a special purpose hardware device that can execute the functionality described herein. The software, for example, can be implemented on a general purpose computing device in the form of a computer including a processing unit, a system memory, and a system bus that couples various system components including the system memory to the processing unit.

Additionally or alternatively, some or all of the functionality, such as the trading platform 1500, can be performed remotely, in the cloud, or via software-as-a-service. The remote functionality can execute on server class computers that have sufficient memory, data storage, and processing power and that run a server class operating system (e.g., Oracle® Solaris®, GNU/Linux®, and the Microsoft® Windows® family of operating systems).

The system can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application, implemented in a suitable programming language or framework.

Method steps of the techniques described herein can be performed by one or more programmable processors executing one or more computer programs to perform functions by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

In various implementations, a particular user device 1510 and/or 1550 includes a web browser 1515 and 1555, respectively, native application, or both, that facilitates execution of the functionality, such as the user interface, described herein. A web browser 1515, 1555 allows the device to request a web page or other program, applet, document, or resource (e.g., from the trading platform, a web server, etc.) with an HTTP request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of the device 1510, 1550 manually requests a resource from a server. Alternatively, the device automatically makes requests with a browser application 1515, 1555. Examples of commercially available web browser software include Microsoft® Internet Explorer®, Mozilla® Firefox®, and Apple® Safari®.

In some implementations, the trading platform 1500 is accessed using client software on a client device 1510, 1550. The client software provides functionality to the device that provides for the implementation and execution of the features described herein. The client software can be implemented in various forms, for example, it can be in the form of a browser 1515, 1555, native application, web page, widget, and/or Java, JavaScript, .Net, Silverlight, Flash, and/or other applet or plug-in that is downloaded to the device and runs in conjunction with a web browser. The client software and the web browser 1515, 1555 can be part of a single client-server interface; for example, the client software can be implemented as a plug-in to the web browser 1515, 1555 or to another framework or operating system. Other suitable client software architecture, including but not limited to widget frameworks and applet technology can also be employed with the client software.

A communications network 1570 can connect user devices 1515 and 1555 with the trading platform 1500, with one or more remote servers or devices, and/or with each other. The communication can take place over media such as standard telephone lines, LAN or WAN links (e.g., T1, T3, 56 kb, X.25), broadband connections (ISDN, Frame Relay, ATM), wireless links (802.11 (Wi-Fi), Bluetooth, GSM, CDMA, etc.), for example. Other communication media are possible. The network 1570 can carry TCP/IP protocol communications, and HTTP/HTTPS requests made by a web browser 1515, 1555, and the connection between the user devices 1515 and 1555 and trading platform 1500 can be communicated over such TCP/IP networks. Other communication protocols are possible.

The system can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems such as those mentioned above, and that operate on one or more computers having hardware such as that described herein.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method comprising:
providing to a seller a first user interface screen comprising a listing of a plurality of targeting attributes and a respective user interface control for each targeting attribute visually indicating whether the targeting attribute is hidden or visible to a potential impression inventory buyer;
providing to one or more potential impression inventory buyers a second user interface screen comprising a visual depiction of an impression inventory specification and visible targeting attributes associated therewith;
receiving from a first one of the potential impression inventory buyers a proposed modification to one or more terms of the impression inventory specification, the terms comprising a minimum price floor for real-time bidding auctions to serve impressions on an impression inventory;
providing to the seller a third user interface screen comprising a visual depiction of the impression inventory specification with a visual identification of the proposed modification to one or more of the terms;
receiving in response to the proposed modification via a first one of the user interface controls of the first user interface screen a change in status of a first one of the targeting attributes from hidden to visible; and
providing an application programming interface (API) including an activity stream API configured to receive messages for broadcast to the seller and the potential impression inventory buyers within the first user interface screen, the second user interface screen, the third user interface screen, or any combination thereof.

2. The method of claim 1, further comprising:
receiving a proposal from the first potential impression inventory buyer for the seller to expose one or more hidden attributes associated with the impression inventory to the first potential impression inventory buyer; and
providing the proposal to the seller.

3. The method of claim 2, wherein the proposal comprises an offer to provide a benefit to the seller in exchange for the seller exposing the one or more hidden attributes.

4. The method of claim 3, wherein the benefit to the seller comprises a price floor for certain impression inventory or a minimum spend commitment.

5. The method of claim 1, wherein a particular attribute of the plurality of targeting attributes comprises a full uniform resource locator, a partial uniform resource locator, a domain, an age, a gender, a content category, an auction price floor, a geography, a tag, a publisher, or a fold position.

6. The method of claim 1, further comprising:
receiving from the seller proposed terms for a sale of the impression inventory;
providing via a user interface the proposed terms to the first potential impression inventory buyer;
receiving from the first potential impression inventory buyer an acceptance or rejection of the proposed terms; and
providing, via the user interface, the acceptance or rejection to the seller.

7. The method of claim 6, wherein the proposed terms comprise a proposed rate for a sale of at least a subset of the impression inventory.

8. The method of claim 6, wherein the proposed terms comprise proposed targeting access to the impression inventory for the first potential impression inventory buyer.

9. The method of claim 1, further comprising:
receiving from the first potential impression inventory buyer proposed terms for a purchase of the impression inventory;
providing, via a user interface, the proposed terms to the seller;
receiving from the seller an acceptance or rejection of the proposed terms; and
providing, via the user interface, the acceptance or rejection to the first potential impression inventory buyer.

10. A system comprising:
one or more computers programmed to perform operations comprising:
providing to a seller a first user interface screen comprising a listing of a plurality of targeting attributes and a respective user interface control for each targeting attribute visually indicating whether the targeting attribute is hidden or visible to a potential impression inventory buyer;
providing to one or more potential impression inventory buyers a second user interface screen comprising a visual depiction of an impression inventory specification and visible targeting attributes associated therewith;
receiving from a first one of the potential impression inventory buyers a proposed modification to one or more terms of the impression inventory specification, the terms comprising a minimum price floor for bidding auctions to serve impressions on an impression inventory;
providing to the seller a third user interface screen comprising a visual depiction of the impression inventory specification with a visual identification of the proposed modification to one or more of the terms;
receiving in response to the proposed modification via a first one of the user interface controls of the first user interface screen a change in status of a first one of the targeting attributes from hidden to visible, the first targeting attribute comprising one or more web domains; and
providing an application programming interface (API) including an activity stream API configured to receive messages for broadcast to the seller and the potential impression inventory buyers within the first user interface screen, the second user interface screen, the third user interface screen, or any combination thereof.

11. The system of claim 10, wherein the operations further comprise:
receiving a proposal from the first potential impression inventory buyer for the seller to expose one or more hidden attributes associated with the impression inventory to the first potential impression inventory buyer; and
providing the proposal to the seller.

12. The system of claim 11, wherein the proposal comprises an offer to provide a benefit to the seller in exchange for the seller exposing the one or more hidden attributes.

13. The system of claim 12, wherein the benefit to the seller comprises a price floor for certain impression inventory or a minimum spend commitment.

14. The system of claim 10, wherein a particular attribute of the plurality of targeting attributes comprises a full uniform resource locator, a partial uniform resource locator, a domain, an age, a gender, a content category, an auction price floor, a geography, a tag, a publisher, or a fold position.

15. The system of claim 10, wherein the operations further comprise:
receiving from the seller proposed terms for a sale of the impression inventory;
providing, via a user interface, the proposed terms to the first potential impression inventory buyer;
receiving from the first potential impression inventory buyer an acceptance or rejection of the proposed terms; and
providing, via the user interface, the acceptance or rejection to the seller.

16. The system of claim 15, wherein the proposed terms comprise a proposed rate for a sale of at least a subset of the impression inventory.

17. The system of claim 15, wherein the proposed terms comprise proposed targeting access to the impression inventory for the first potential impression inventory buyer.

18. The system of claim 10, wherein the operations further comprise:
receiving from the first potential impression inventory buyer proposed terms for a purchase of the impression inventory;
providing, via a user interface, the proposed terms to the seller;
receiving from the seller an acceptance or rejection of the proposed terms; and
providing, via the user interface, the acceptance or rejection to the first potential impression inventory buyer.

19. A computer storage medium comprising instructions that, when executed by at least one processor, facilitate a performance of operations, the operations comprising:

providing to a seller a first user interface screen comprising a listing of a plurality of targeting attributes and a respective user interface control for each targeting attribute visually indicating whether the targeting attribute is hidden or visible to a potential impression inventory buyer;

providing to one or more potential impression inventory buyers a second user interface screen comprising a visual depiction of an impression inventory specification and visible targeting attributes associated therewith;

receiving from a first one of the potential impression inventory buyers a proposed modification to one or more terms of the impression inventory specification, the terms comprising a minimum price floor for bidding auctions to serve impressions on an impression inventory;

providing to the seller a third user interface screen comprising a visual depiction of the impression inventory specification with a visual identification of the proposed modification to one or more of the terms; and receiving in response to the proposed modification via a first one of the user interface controls of the first user interface screen a change in status of a first one of the targeting attributes from hidden to visible.

20. The computer storage medium of claim 19, wherein the operations further comprise:

providing an application programming interface (API) including an activity stream API configured to receive messages for broadcast to the seller and the potential impression inventory buyers within the first user interface screen, the second user interface screen, the third user interface screen, or any combination thereof.

* * * * *